US012311658B2

(12) United States Patent
Inoue et al.

(10) Patent No.: US 12,311,658 B2
(45) Date of Patent: May 27, 2025

(54) IMAGE FORMING APPARATUS AND CONTROL DEVICE

(71) Applicants: Kohsuke Inoue, Boulder, CO (US); Hideaki Suzuki, Kanagawa (JP)

(72) Inventors: Kohsuke Inoue, Boulder, CO (US); Hideaki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 18/202,348

(22) Filed: May 26, 2023

(65) Prior Publication Data

US 2023/0391111 A1 Dec. 7, 2023

(30) Foreign Application Priority Data

Jun. 3, 2022 (JP) ................................ 2022-091048

(51) Int. Cl.
*B41J 11/00* (2006.01)
*B41J 11/42* (2006.01)

(52) U.S. Cl.
CPC ............ *B41J 11/42* (2013.01); *B41J 11/0095* (2013.01)

(58) Field of Classification Search
CPC .............................. B65H 7/14; B41J 11/0095
See application file for complete search history.

(56) References Cited

U.S. PATENT DOCUMENTS

2011/0234675 A1* 9/2011 Korogi ..................... B41J 29/38 347/16
2021/0016580 A1 1/2021 Kaneko et al.

FOREIGN PATENT DOCUMENTS

JP 2000062244 A * 2/2000 ................ B41J 2/45
JP 2011-207556 10/2011
JP 2013-086426 5/2013
JP 2013-169688 9/2013
JP 5444079 B2 * 3/2014 .......... B41J 11/0095
JP 2015-009545 1/2015
JP 2022063088 A * 4/2022
JP 2023009414 A * 1/2023

* cited by examiner

*Primary Examiner* — Justin Seo
(74) *Attorney, Agent, or Firm* — Duft & Bornsen, PC

(57) ABSTRACT

An image forming apparatus includes a conveyance section that conveys a recording medium along a conveyance path. The image forming apparatus includes a floating detector including a light projector and a light receiver and that detects floating of the recording medium based on a light reception result by the light receiver of light emitted from the light projector and passing above the conveyance path. The image forming apparatus includes a temperature detector that detects a temperature in an optical path of the light. The image forming apparatus includes a variable mechanism that changes an emission direction of the light from the light projector. The image forming apparatus includes circuitry to control an operation of the variable mechanism based on the temperature detected by the temperature detector.

9 Claims, 15 Drawing Sheets

| TEMPERATURE DIFFERENCE ΔT | INCLINATION AMOUNT θ |
|---|---|
| LESS THAN 2°C | +1° |
| 2°C OR MORE AND LESS THAN 8°C | +2° |
| 8°C OR MORE AND LESS THAN 14°C | +3° |
| 14°C OR MORE AND LESS THAN 20°C | +4° |
| 20°C OR MORE | +5° |

IMAGE FORMING APPARATUS AND CONTROL DEVICE

CROSS-REFERENCE TO RELATED APPLICATION

This patent application is based on and claims priority pursuant to 35 U.S.C. § 119(a) to Japanese Patent Application No. 2022-091048, filed on Jun. 3, 2022, in the Japan Patent Office, the entire disclosure of which is hereby incorporated by reference herein.

BACKGROUND

Technical Field

The present disclosure relates to an image forming apparatus and a control device.

Related Art

A recording apparatus including a light projector that emits a laser beam and a light receiver that receives the laser beam is known. The light projector projects the laser beam to pass above a conveyance path of a recording medium. The recording apparatus detects floating of a recording medium when detecting that the recording medium blocks the laser beam.

SUMMARY

Embodiments of the present disclosure provide an image forming apparatus. The image forming apparatus includes a conveyance section that conveys a recording medium along a conveyance path. The image forming apparatus includes a floating detector including a light projector and a light receiver and that detects floating of the recording medium based on a light reception result by the light receiver of light emitted from the light projector and passing above the conveyance path. The image forming apparatus includes a temperature detector that detects a temperature in an optical path of the light. The image forming apparatus includes a variable mechanism that changes an emission direction of the light from the light projector. The image forming apparatus includes circuitry to control an operation of the variable mechanism based on the temperature detected by the temperature detector.

Embodiments of the present disclosure provide a control device for a medium floating detection system that detects floating of a recording medium based on a light reception result by a light receiver of light emitted from a light projector and passing above a conveyance path of the recording medium. The control device includes a temperature detector that detects a temperature in an optical path of the light. The control device includes circuitry to control an operation of a variable mechanism that changes an emission direction of the light from the light projector based on the temperature detected by the temperature detector.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
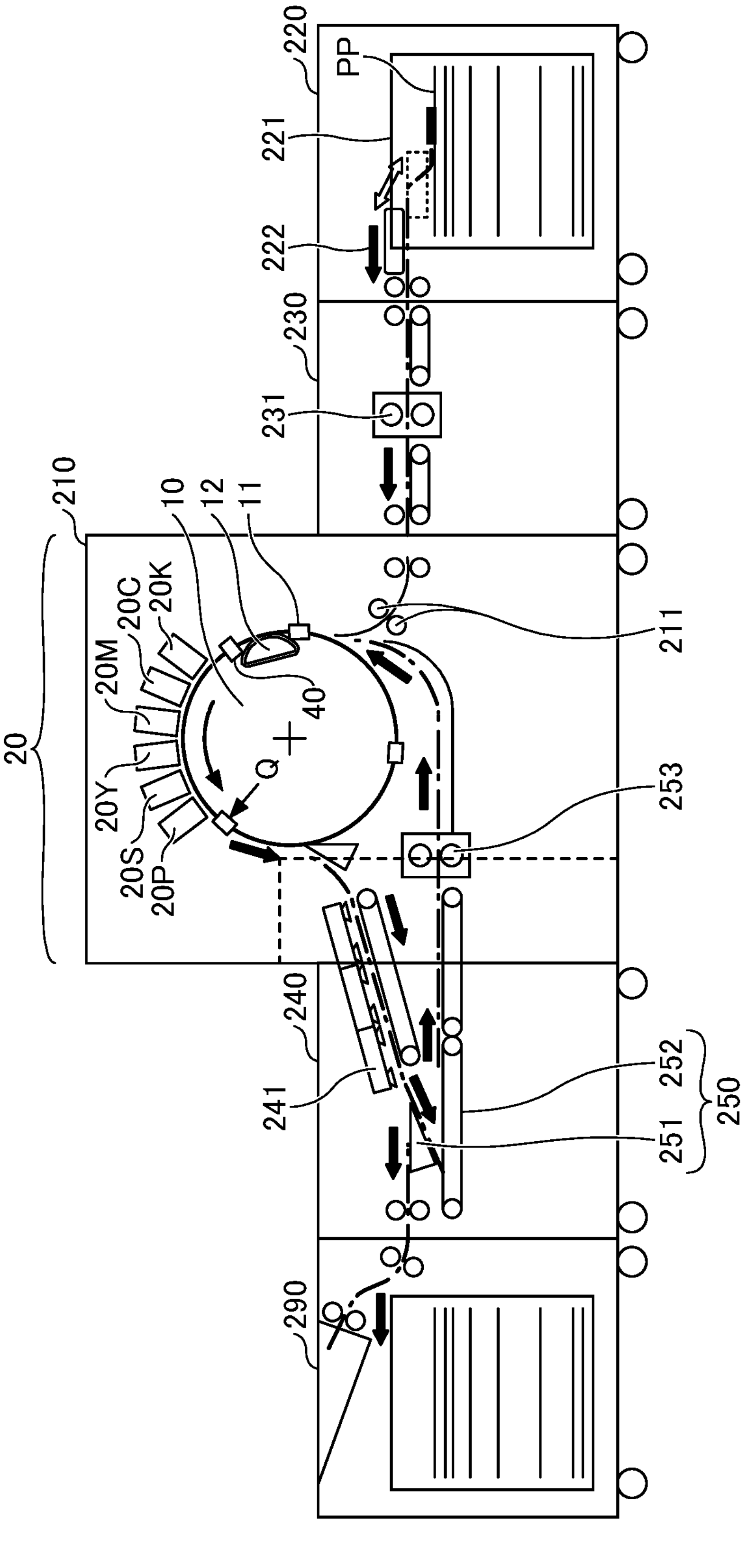
FIG. 1 is a schematic view illustrating a general arrangement of an image forming apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An embodiment of the present disclosure is described below referring to the drawings. In each drawing, three orthogonal directions may be expressed by arrows indicating an X-axis direction, a Y-axis direction, and a Z-axis direction. The X-axis direction extends in a conveyance direction of a recording medium PP. The Y-axis direction is a direction intersecting with the conveyance direction, and extends in a width direction of the recording medium PP. The Z-axis direction extends in a thickness direction of the recording medium PP.

General Arrangement of Image Forming Apparatus 200

FIG. 1 illustrates a general arrangement of an image forming apparatus 200 according to an embodiment. The image forming apparatus 200 illustrated in FIG. 1 is an on-demand line-scanning inkjet recording apparatus. As illustrated in FIG. 1, the image forming apparatus 200 according to the embodiment includes an image forming section 210, a sheet feeding section 220, a registration adjustment section 230, a drying section 240, a recording medium reverse section 250, and a sheet ejection section 290.

The sheet feeding section 220 picks up recording media PP stacked in a sheet feeding stack 221 one by one using an air separator 222, and sends the recording medium PP to the registration adjustment section 230. The registration adjustment section 230 corrects an inclination of the recording medium PP sent from the sheet feeding section 220 using a pair of registration rollers 231. Then, the registration adjustment section 230 sends the recording medium PP whose inclination has been corrected to the image forming section 210.

The image forming section 210 includes a head module 20 that discharges ink onto the recording medium PP. The head module 20 includes head modules 20K, 20C, 20M, 20Y, and 20P. The head modules 20K, 20C, 20M, 20Y, 20S, and 20P are referred to as head modules 20 unless otherwise distinguished.

The plurality of head modules 20 are disposed along an outer peripheral surface 10*a* of a drum 10.

The head modules 20 are spaced apart from the outer peripheral surface 10*a* in a radial direction of the drum 10.

The recording medium PP is placed on the outer peripheral surface 10*a* of the drum 10, and is conveyed in a circumferential direction of the drum 10 with rotation of the drum 10.

A recording medium gripper 11 that holds the recording medium PP is provided at the outer peripheral surface 10*a* of the drum 10. In the image forming section 210, the drum rotates in a state in which the recording medium gripper 11 pinches the leading end of the recording medium PP to convey the recording medium PP to a position facing the head modules 20. The recording medium PP is disposed between the outer peripheral surface 10*a* of the drum 10 and the head modules 20. The drum 10 is an example of a conveyance section that conveys a recording medium along a conveyance path.

Each of the head modules 20 discharges ink onto the recording medium PP to form an image on a surface of the recording medium PP. The image forming section 210 sends the recording medium PP on which the image has been formed to the drying section 240.

The drying section 240 includes a heater 241 that dries the recording medium PP. The recording medium PP is heated by the heater 241 while being conveyed. The drying section 240 sends the dried recording medium PP to the sheet ejection section 290. When duplex printing is performed, the drying section 240 sends the recording medium PP to the recording medium reverse section 250.

The recording medium reverse section 250 includes a recording medium reversing mechanism 251 that reverses the recording medium PP and a reverse conveyance section 252 that conveys the reversed recording medium PP. The recording medium reverse section 250 reverses the recording medium PP sent from the drying section 240 using the recording medium reversing mechanism 251, and sends the reversed recording medium PP to the image forming section 210 using the reverse conveyance section 252. Registration rollers 253 provided inside the image forming section 210 correct an inclination of the recording medium PP sent from the recording medium reverse section 250 and convey the recording medium PP to the drum 10.

The sheet ejection section 290 stacks a plurality of recording media PP sent from the drying section 240 in a state in which the recording media PP are aligned with each other.

Configuration of Head Module 20

Figure 2:
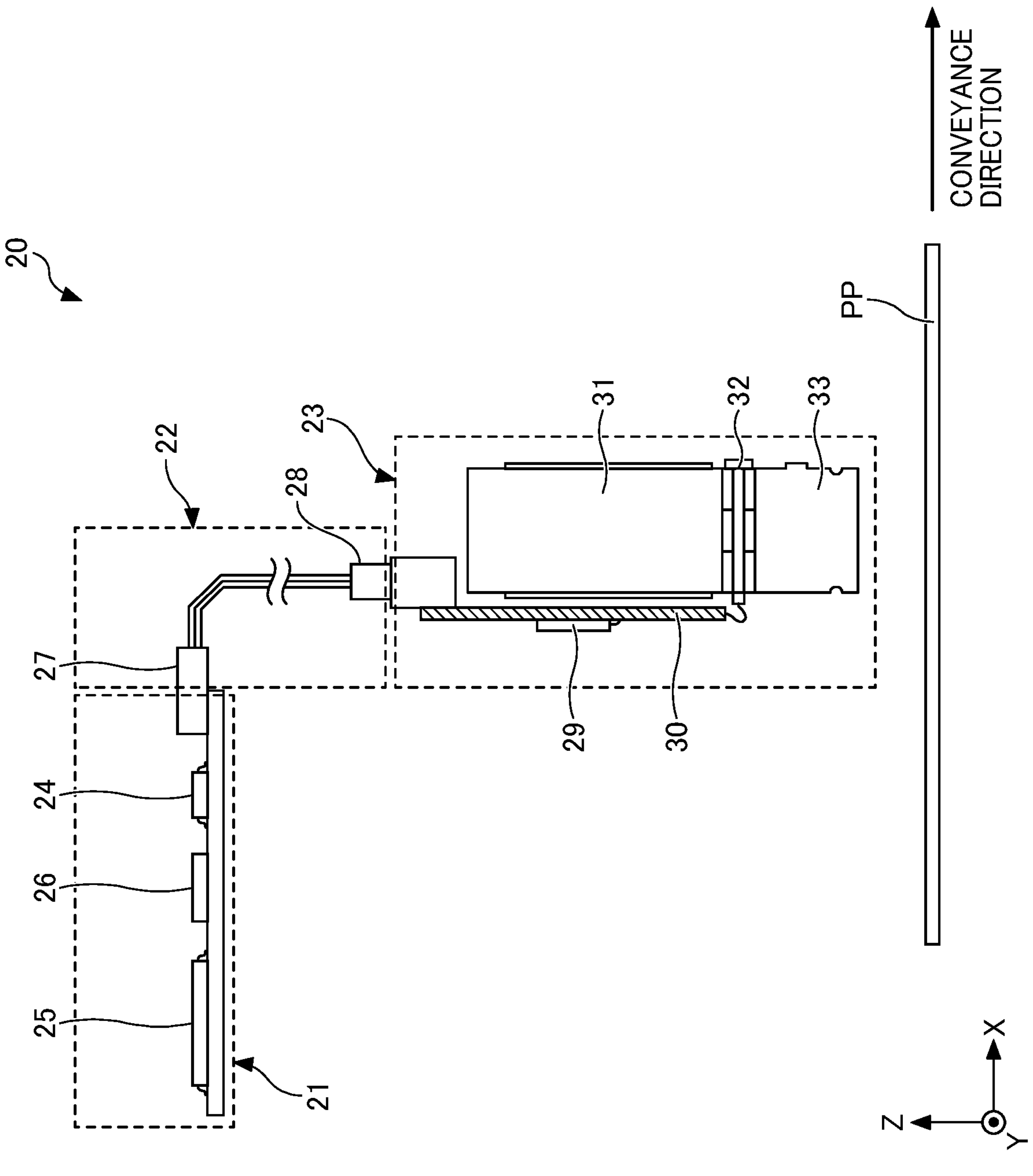
FIG. 2 is a schematic view illustrating a configuration of an inkjet recording module included in the image forming apparatus, according to an embodiment of the present disclosure.

The head module 20 is described next referring to FIG. 2. As illustrated in FIG. 2, the head module 20 includes a drive control board 21, a cable 22, and an inkjet recording head 23. Hereinafter, the "inkjet recording head" may be abbreviated as a "recording head". The head module 20 includes a plurality of recording heads 23. The plurality of recording heads 23 are arranged in the Y-axis direction to define a line head.

On the drive control board 21, a drive controller 25, a drive waveform generator 26, and a memory 24 are mounted. The drive controller 25 controls a driving element for discharging ink. The drive waveform generator 26 generates a pulse signal that is supplied to the driving element. The memory 24 stores various items of information.

The cable 22 includes connectors 27 and 28. The connector 27 is connected to the drive control board 21. The connector 28 is connected to the recording head 23. The cable 22 transmits an analog signal and a digital signal between the drive control board 21 and the recording head 23.

The recording head 23 includes a residual vibration detection module 29, a head substrate 30, an in-head ink tank 31, a head drive integrated circuit (IC) substrate 32, and a rigid plate 33. The recording head 23 includes an ink flow path through which ink flows, a driving element for discharging the ink, a pressure chamber that applies a pressure to the ink, and a nozzle plate having a nozzle for discharging the ink. The driving element is, for example, a piezoelectric element. The ink in the in-head ink tank 31 flows through the ink flow path and is supplied to the pressure chamber. The driving element is driven to increase the pressure of the ink in the pressure chamber, and the ink is discharged from the nozzle. An ink droplet discharged from the nozzle lands on a recording medium PP.

The residual vibration detection module 29 detects residual vibration of the ink in the ink flow path in the recording head 23. The head substrate 30 is electrically connected to the drive control board 21 and receives a drive waveform. The head drive IC substrate 32 is electrically connected to the head substrate 30. The head drive IC substrate 32 drives the driving element in accordance with the drive waveform.

The rigid plate 33 is disposed below the head drive IC substrate 32 to increase the rigidity of the recording head 23. The rigid plate 33 partly defines a housing of the recording head 23. The pressure chamber, the driving element, the nozzle, and so forth, are disposed in a region surrounded by the rigid plate 33.

The ink discharged from the nozzle flies in the Z-axis direction, and the ink adheres onto the recording medium PP.

The image forming apparatus 200 of the present embodiment is an on-demand line-scanning inkjet recording apparatus. Thus, the plurality of recording heads 23 of the head module 20 are arranged in a direction orthogonal to the conveyance direction of the recording medium PP. The application of the image forming apparatus 200 is not limited to the line-scanning inkjet recording apparatus, and may be a recording apparatus using another system. The recording apparatus of another system is, for example, a serial-scanning printer in which a recording head forms an image on a surface of a recording medium while moving in a main-scanning direction.

Recording Medium Floating Detection System

Figure 3:
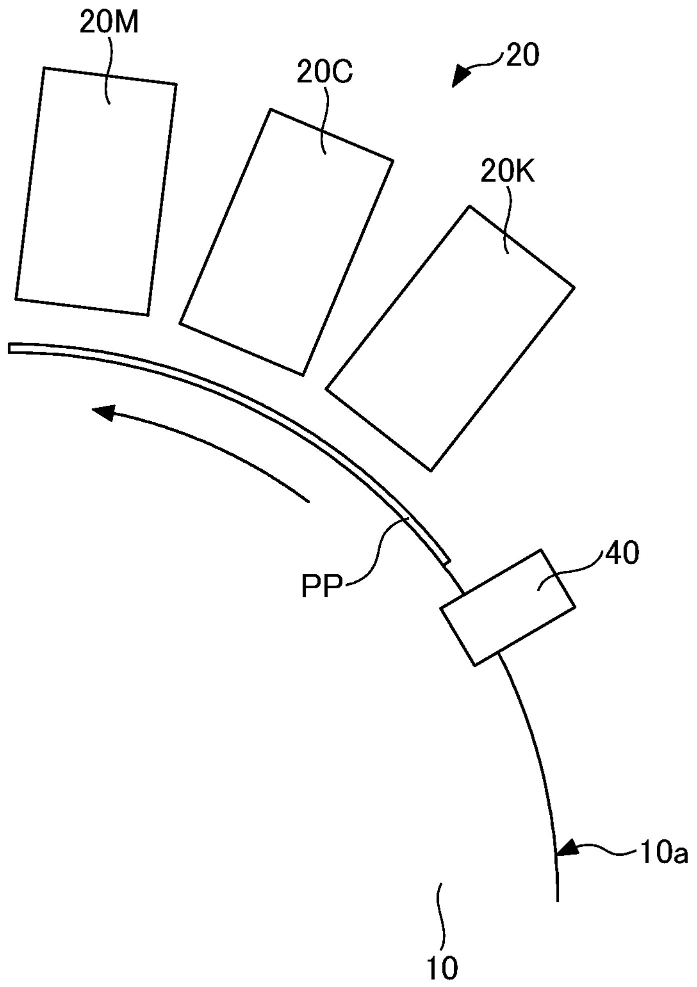
FIG. 3 is a schematic view illustrating an arrangement of a recording medium floating detection sensor, according to an embodiment of the present disclosure.
Figure 4:
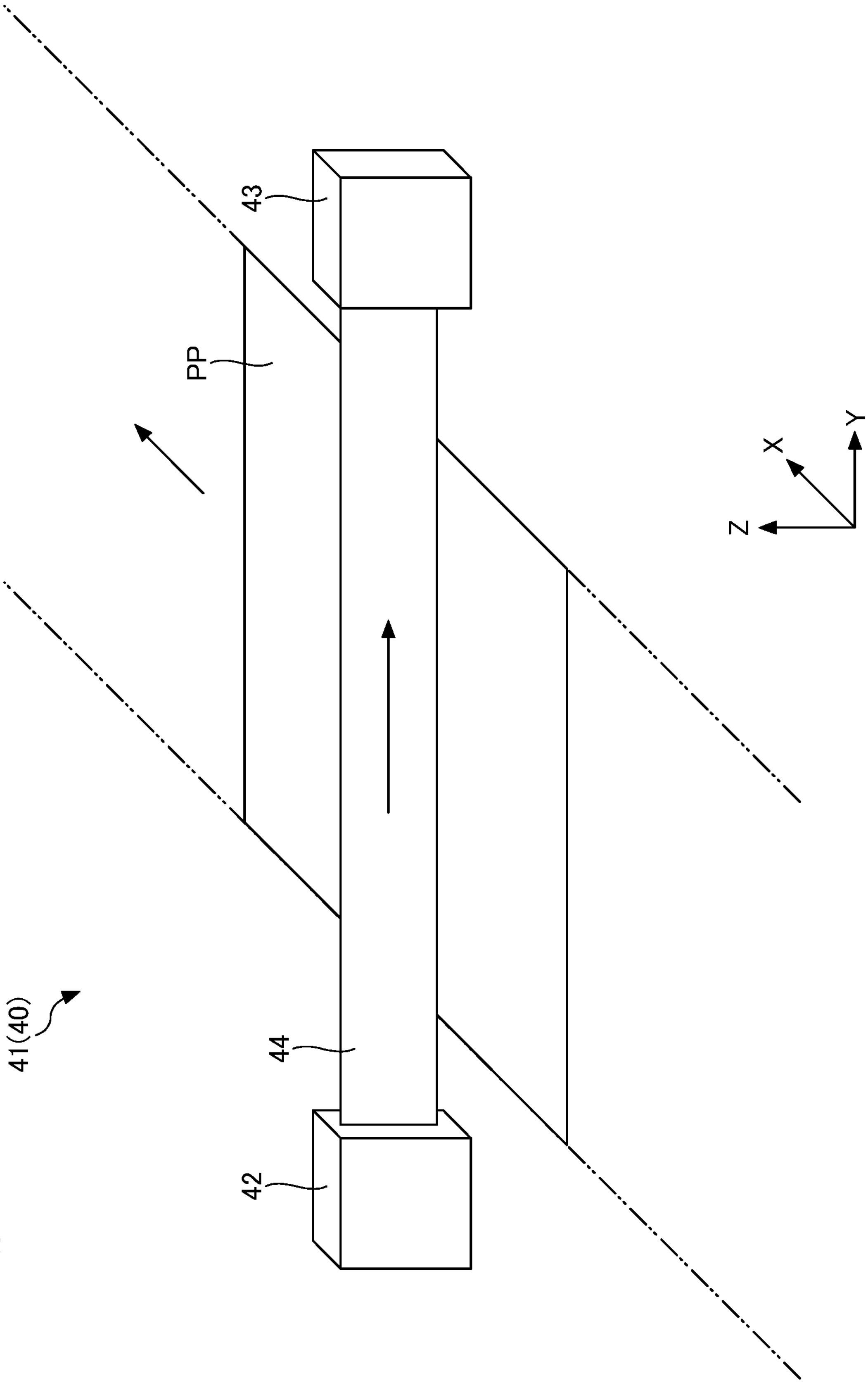
FIG. 4 is a schematic view illustrating the recording medium floating detection sensor, according to an embodiment of the present disclosure.

A recording medium floating detection system 40 is described next referring to FIGS. 3 to 6. FIG. 3 is a schematic view illustrating an example of an arrangement of a recording medium floating detection sensor 41. FIG. 4 is a schematic view illustrating an example of the recording medium floating detection sensor 41. The image forming apparatus 200 includes the recording medium floating detection system 40 that detects floating of a recording medium PP from the conveyance path. As illustrated in FIG. 3, the recording medium floating detection system 40 is disposed upstream of the head module 20 in the conveyance path of the recording medium PP. The recording medium floating detection system 40 is disposed at a position close to the outer peripheral surface 10*a* of the drum 10 in the radial direction of the drum 10. A portion of the conveyance path is formed along the outer peripheral surface 10*a* of the drum 10. The recording medium PP is conveyed in the circumferential direction of the drum 10 with rotation of the drum 10.

As illustrated in FIG. 4, the recording medium floating detection system 40 includes the recording medium floating detection sensor 41. The recording medium floating detection sensor 41 includes a light projector 42 that projects a laser beam 44 and a light receiver 43 that receives the laser beam 44. The light projector 42 includes a light emitting element that emits the laser beam 44, and the light receiver 43 includes a light receiving element that receives the laser beam 44. The light projector 42 projects the laser beam 44, for example, in the Y-axis direction. The laser beam 44 passes through an area above the outer peripheral surface 10*a* of the drum 10. The outer peripheral surface 10*a* defines a conveyance surface along the conveyance path of the recording medium PP. The laser beam 44 has a predetermined width in the Z-axis direction. In FIG. 4, the conveyance direction of the recording medium PP is illustrated linearly in the X-axis direction; however, in an actual situation, the conveyance direction of the recording medium PP curves along the outer peripheral surface 10*a* of the drum 10.

The light receiver 43 receives the laser beam 44 emitted from the light projector 42. The light receiver 43 outputs a voltage value based on the light intensity of the received laser beam 44. The recording medium floating detection system 40 can detect the height position of the recording medium PP in the Z-axis direction from the voltage value based on the light intensity of the received laser beam. When the laser beam 44 is blocked by the recording medium PP, the light intensity of the laser beam 44 received by the light receiver 43 changes in accordance with the position of the recording medium PP in the Z-axis direction. The light intensity of the laser beam 44 received by the light receiver 43 is smaller when the overlap between the laser beam 44 and the recording medium PP in the Z-axis direction is large compared to when the overlap between the laser beam 44 and the recording medium PP is small. The recording medium floating detection sensor 41 is an example of a floating detector that detects floating of the recording medium PP. "Floating of the recording medium PP" is, for example, floating of the recording medium PP from the outer peripheral surface 10*a* of the drum 10. "The voltage value based on the light intensity of the received laser beam" is an example of a light reception result by the light receiver.

Figure 5:
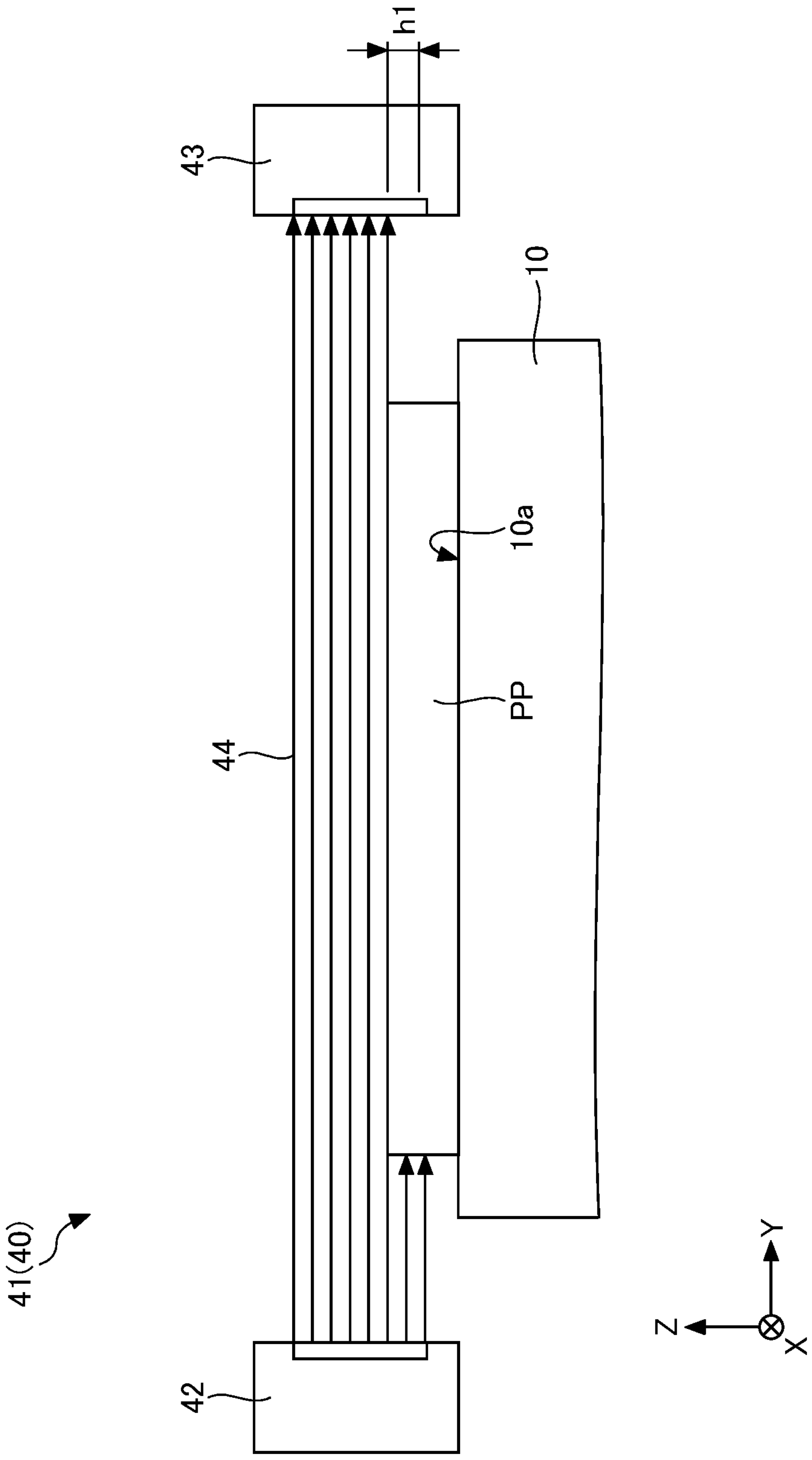
FIG. 5 illustrates a distribution of laser beams in a normal state, according to an embodiment of the present disclosure.

A distribution of laser beams in an ideal case is described next referring to FIG. 5. FIG. 5 illustrates the distribution of laser beams in the ideal case. The ideal case is a case where the influence of a temperature difference is small in the optical path of the laser beam and the laser beam 44 travels straight in the Y-axis direction. The laser beam 44 has a predetermined width in the Z-axis direction. In the Z-axis direction, a direction away from the outer peripheral surface 10*a* of the drum 10 is referred to as upward and downward directions. The height extends in the Z-axis direction. In the radial direction of the drum it is assumed that a side close to the outer peripheral surface 10*a* is a lower side, and a side distant from the outer peripheral surface 10*a* is an upper side.

In the ideal case, the laser beam 44 is not inclined with respect to the Y-axis direction. The recording medium floating detection system 40 can calculate a detection height h1 of the recording medium PP in the Z-axis direction based on the voltage value output from the light receiver 43. The detection height h1 may be a range of heights at which the laser beam 44 is not received by the light receiver 43. The light receiver 43 cannot receive the laser beam 44 in a range from the lower end of the light receiving element to an area overlapping the recording medium PP. The range in which light cannot be received serves as the detection height h1.

Figure 6:
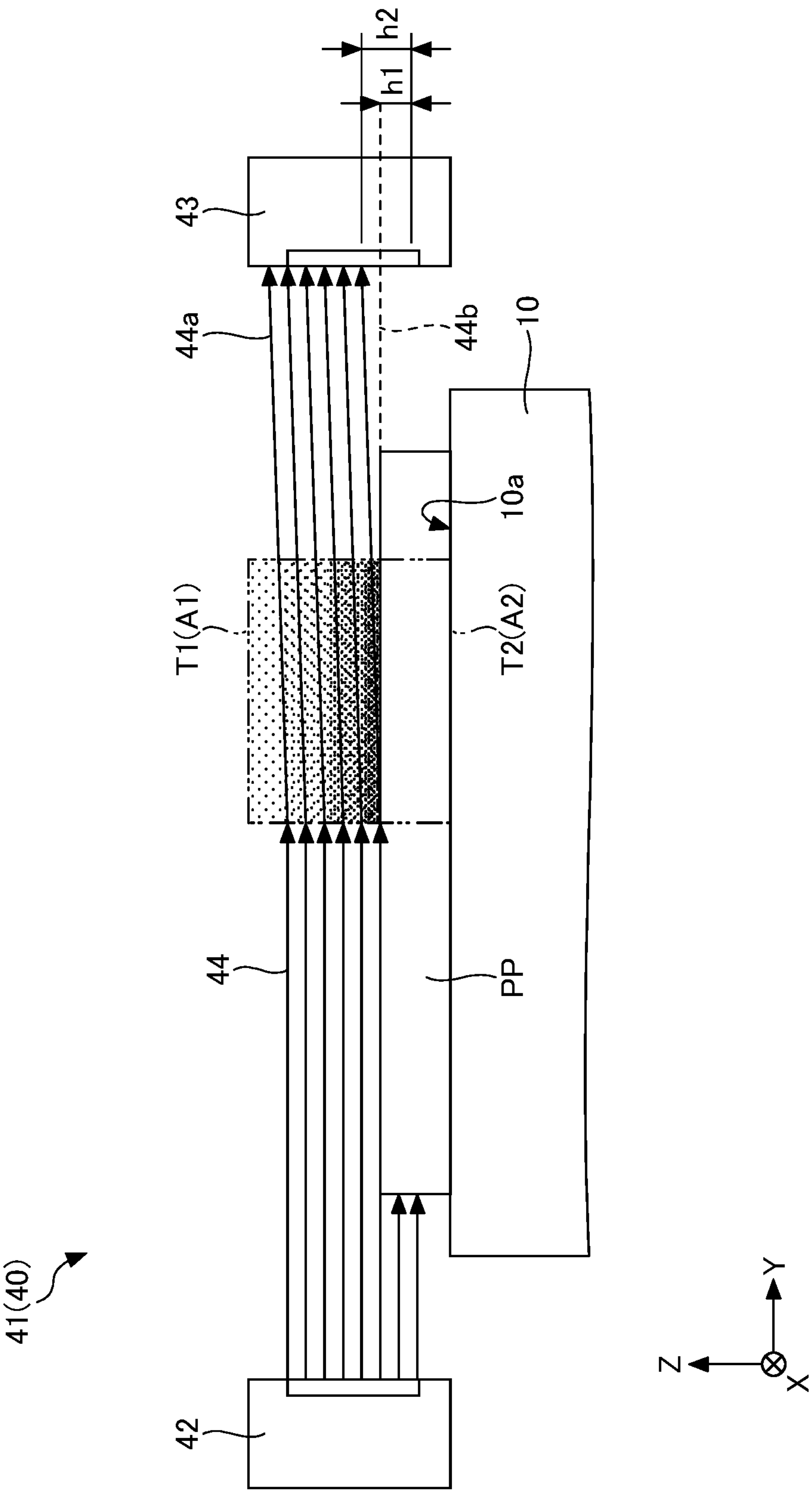
FIG. 6 illustrates a distribution of laser beams when a temperature difference is generated, according to an embodiment of the present disclosure.

A distribution of laser beams when a temperature difference is generated in the optical path of the laser beam 44 is described next referring to FIG. 6. FIG. 6 illustrates an example of a distribution of laser beams when a temperature difference is generated in the optical path. As illustrated in FIG. 6, a temperature difference may be generated in the optical path of the laser beam 44.

In FIG. 6, a temperature difference is generated in the Z-axis direction, and a temperature distribution is generated. For example, a temperature T2 at a position A2 close to the outer peripheral surface 10*a* of the drum 10 is higher than a temperature T1 at a position A1 distant from the outer peripheral surface 10*a* of the drum 10 (T2>T1).

In this way, when a temperature difference is generated in the optical path of the laser beam 44, the laser beam 44 bends to a low temperature side. The laser beam 44 bends to the low temperature side so as to be away from the outer peripheral surface 10*a* on a high temperature side. Referring to FIG. 6, the laser beam 44 bends and is inclined to be away from the outer peripheral surface 10*a* in the Z-axis direction. In FIG. 6, a solid line indicates a laser beam 44*a* that travels while being inclined, and a broken line indicates a lower end 44*b* of the laser beam 44 that passes above the recording medium PP in a case where the laser beam 44 travels ideally without being inclined. The detection height h1 when the laser beam 44 ideally travels corresponds to a height position of the lower end 44*b* of the laser beam 44 passing above the recording medium PP.

A detection height h2 when the laser beam 44 is inclined is higher than the detection height h1.

In this case, the light receiver 43 outputs a voltage value based on the detection height h2 that is higher than the actual detection height h1 of the recording medium PP. The laser beam 44 that has passed above the recording medium PP, for example, curves upward, and hence the light receiver 43 outputs a voltage value corresponding to the detection height h2 that is higher than the detection height h1. Thus, in the cases illustrated in FIGS. 5 and 6, the heights of the recording media PP are the same; however, in the case in FIG. 6, the detection height h2 is high, and hence it may be recognized that the recording medium PP is present at a position higher than the predetermined conveyance path. The recording medium floating detection sensor 41 may erroneously detect floating of the recording medium PP.

"The temperature in the optical path" is a temperature in the optical path through which light passes, and may be a temperature of a space in which the optical path is formed. For example, the temperature in the optical path may be detected by detecting the temperature of the space in which the optical path is formed. The temperature in the optical path may be detected by detecting the temperature of a space adjacent to the optical path. The temperature in the optical path may be detected by detecting the temperature of a recording medium that has passed through the space in which the optical path is formed. The temperature in the optical path may be detected by detecting the temperature of the outer peripheral surface 10*a* of the drum 10 adjacent to the optical path. Alternatively, the temperature in the optical path may be detected by detecting another element that influences the temperature in the optical path.

Variable Mechanism

Figure 7:
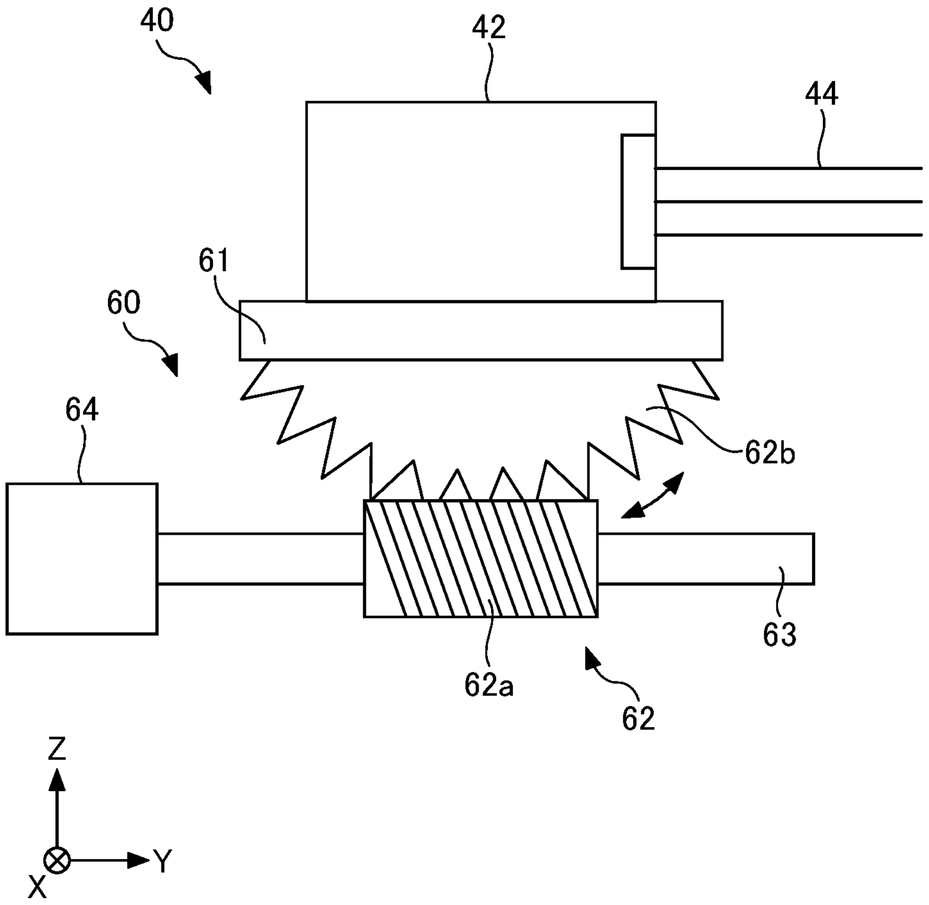
FIG. 7 is a schematic view illustrating a variable mechanism that changes an emission direction of a laser beam from a light projector, according to an embodiment of the present disclosure.

A variable mechanism 60 that inclines the emission direction of a laser beam 44 is described next referring to FIG. 7. FIG. 7 is a schematic view illustrating an inclination mechanism that inclines the emission direction of the laser beam 44. The recording medium floating detection system 40 includes the variable mechanism 60 that inclines the emission direction of the laser beam 44.

The variable mechanism 60 includes a support stand 61 that supports the light projector 42, a worm gear 62 that changes the posture of the support stand 61, a rotation shaft 63, and a motor 64. The light projector 42 is placed on the support stand 61 and is secured to the support stand 61.

The worm gear 62 includes a worm 62*a* provided on the rotation shaft 63, and a worm wheel 62*b* that meshes with the worm 62*a*. The worm wheel 62*b* is secured to, for example, a bottom surface of the support stand 61. The rotation shaft 63 extends in the Y-axis direction. The motor 64 rotationally drives the rotation shaft 63. The motor 64 may be, for example, a stepping motor. When the rotation shaft 63 is rotated, the worm wheel 62*b* that meshes with the worm 62*a* rotates and moves around an axial line extending in the X-axis direction. Thus, the support stand 61 and the light projector 42 rotate and move together with the worm wheel 62*b* as a unit. As described above, changing the posture of the light projector 42 can adjust the emission direction of the laser beam 44. The variable mechanism 60 can incline the emission direction of the laser beam 44 with respect to the Y-axis direction.

Relationship Between Temperature Difference and Inclination Amount

Figures 8, 9:
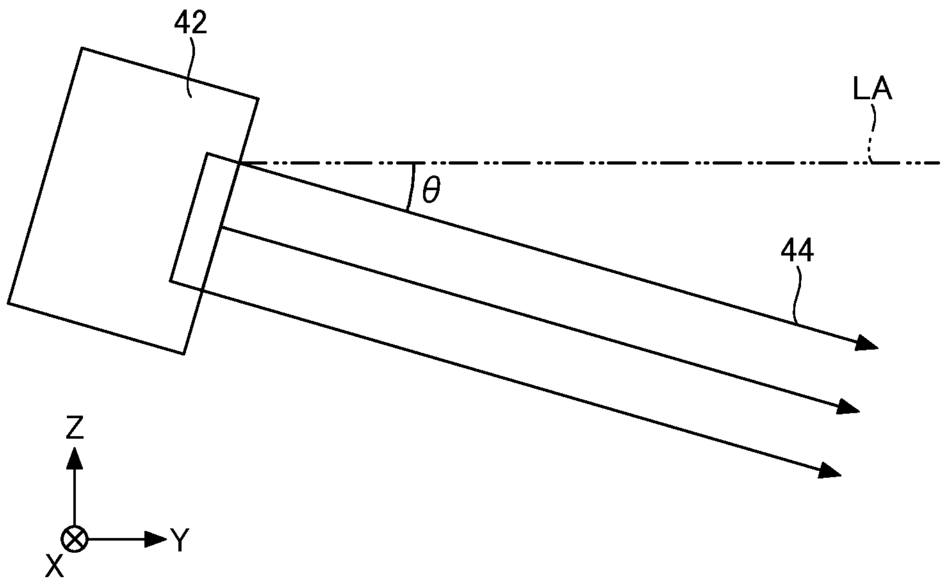
FIG. 8 illustrates an inclination amount of a laser beam, according to an embodiment of the present disclosure.
FIG. 9 is a table presenting the relationship between the temperature difference in an optical path of a laser beam and the inclination amount of the laser beam, according to an embodiment of the present disclosure.

The relationship between the temperature difference in the optical path of the laser beam 44 and the inclination amount θ of the laser beam 44 is described next referring to FIGS. 8 and 9. FIG. 8 illustrates an example of the inclination amount θ of the laser beam 44. FIG. 9 is a table presenting an example of the relationship between the temperature difference in the optical path of the laser beam 44 and the inclination amount θ of the laser beam 44.

As illustrated in FIG. 8, the inclination amount θ of the laser beam 44 is an inclination angle of the laser beam 44 with respect to a reference line LA extending in the Y-axis direction. For example, it is assumed that the inclination amount θ when the laser beam 44 is inclined downward with respect to the reference line LA is positive (plus). An inclination amount of the light projector 42 may be used as the inclination amount θ of the laser beam 44. The expression "downward with respect to the reference line LA" represents a side close to the outer peripheral surface 10*a* of the drum 10.

The table presented in FIG. 9 presents the relationship between the temperature difference ΔT and the inclination amount θ. The temperature difference ΔT is, for example, the difference between the temperature T2 on the high temperature side and the temperature T1 on the low temperature side illustrated in FIG. 6 (ΔT=T2−T1).

The recording medium floating detection system 40 sets the inclination amount θ to 0° (deg) when the temperature difference ΔT is 0 degrees. The recording medium floating detection system 40 can set the inclination amount θ to +1° when the temperature difference ΔT is less than 2° C. The recording medium floating detection system 40 can set the inclination amount θ to +2° when the temperature difference ΔT is 2° C. or more and less than 8° C. The recording medium floating detection system 40 can set the inclination amount θ to +3° when the temperature difference ΔT is 8° C. or more and less than 14° C. The recording medium floating detection system 40 can set the inclination amount θ to +4° when the temperature difference ΔT is 14° C. or more and less than 20° C. The recording medium floating detection system 40 can set the inclination amount θ to +5° when the temperature difference ΔT is 20° C. or more. Note that these values are any values and can be changed as appropriate. For example, in the table presented in FIG. 9, the inclination amount is classified into five levels; however, the inclination amount may be classified into four levels or less, or may be classified into six levels or more. When the temperature difference ΔT is large, the inclination amount θ for correcting the inclination of the emission direction of the laser beam 44 is larger as compared to when the temperature difference ΔT is small.

Figure 10:
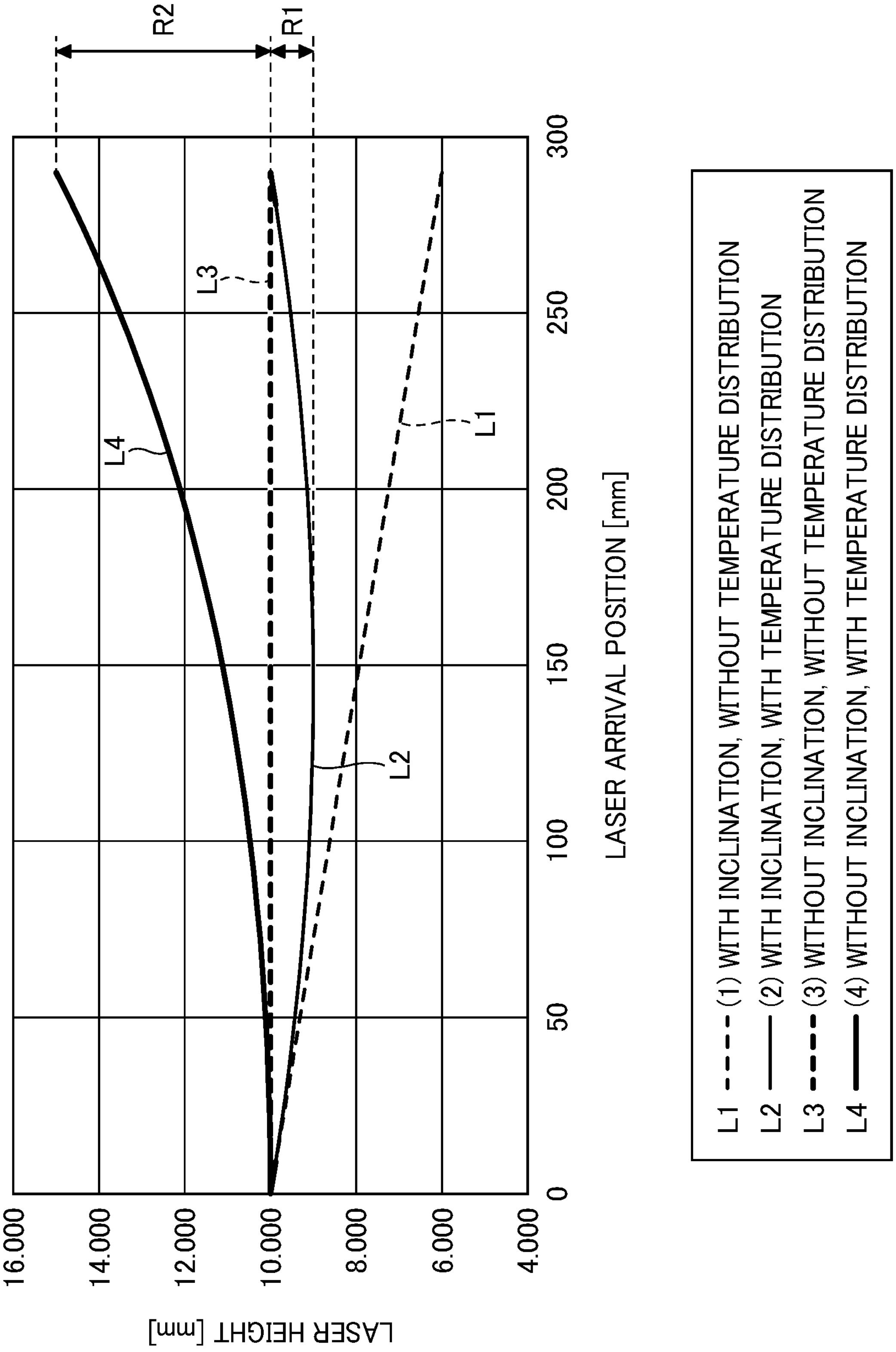
FIG. 10 is a graph presenting the relationship between the arrival position of a laser beam and the height position of the laser beam, according to an embodiment of the present disclosure.

Relationship Between Arrival Position of Laser Beam and Height Position of Laser Beam The relationship between the arrival position of the laser beam 44 and the height position of the laser beam 44 is described next referring to FIG. 10. FIG. 10 is a graph presenting the relationship between the arrival position of the laser beam 44 and the height position of the laser beam 44. In FIG. 10, the horizontal axis indicates the arrival position [mm] of the laser beam 44, and the vertical axis indicates the height position of the laser beam 44. The emission point of the laser beam 44 by the light projector 42 has a laser arrival position of 0 mm and has a laser height of 10.000 mm. The arrival position of the laser beam 44 is a position in the Y-axis direction. The height position of the laser beam 44 is a position in the Z-axis direction. The height position of the laser beam 44 may be, for example, a height position from the outer peripheral surface 10*a* of the drum 10.

FIG. 10 presents the position of the laser beam 44 having the smallest height among the laser beams 44. The smallest height is a position closest to the outer peripheral surface of the drum 10.

A graph L1 indicates a height of the laser beam 44 when the light projector 42 has an inclination and there is no temperature difference. A graph L2 indicates a height of the laser beam 44 when the light projector 42 has an inclination and there is a temperature difference. The case where the light projector 42 has an inclination represents a case where the light projector 42 is inclined and hence the emission direction of the laser beam 44 is inclined with respect to the Y-axis direction. In the case of the graphs L1 and L2, the inclinations of the light projector 42 are the same.

A graph L3 indicates a height of the laser beam 44 when the light projector 42 has no inclination and there is no temperature difference. The case presented in the graph L3 is an ideal case. A graph L4 indicates a height of the laser beam 44 when the light projector 42 has no inclination and there is a temperature difference. The case where the light projector 42 has no inclination is a case where the laser beam 44 is emitted in the Y-axis direction.

The case indicated by the graphs L1 and L3 is a case where there is no temperature difference, and the laser beam 44 travels straight in the emission direction without a change. The case indicated by the graphs L2 and L4 is a case where there is a temperature difference and the laser beam 44 bends upward. In the case indicated by the graph L2, the light projector 42 is inclined downward to incline the emission direction of the laser beam 44, and hence the positional deviation of the laser beam 44 can be suppressed. In the case indicated by the graph L4, since the light projector 42 is not inclined, the laser beam 44 emitted in the Y-axis direction bends upward. In the case indicated by the graph L4, the positional deviation is larger than the case indicated by the graph L2.

FIG. 10 presents regions R1 and R2 in which floating of a recording medium cannot be detected. Hereinafter, "a region in which floating of a recording medium cannot be detected" is referred to as "an undetectable region". The undetectable region R1 is in the case of the graph L2, and the undetectable region R2 is in the case of the graph L4. The undetectable region R1 is half or less of the undetectable region R2.

For example, in the case of the graphs L2 and L4, when the recording medium PP is present above the lines, the laser beam 44 is blocked, and hence the recording medium floating detection system 40 can recognize the position of the recording medium PP. The "regions R1 and R2 in which floating of a recording medium cannot be detected" described above may be "a region in which it is erroneously detected that the recording medium PP is floating" although the recording medium PP is not floating. Moreover, when a region without the laser beam 44 is generated because the laser beam 44 bends, the region without the laser beam 44 is a region in which the recording medium PP cannot be detected.

Hardware Configuration of Image Forming Apparatus

Figure 11:
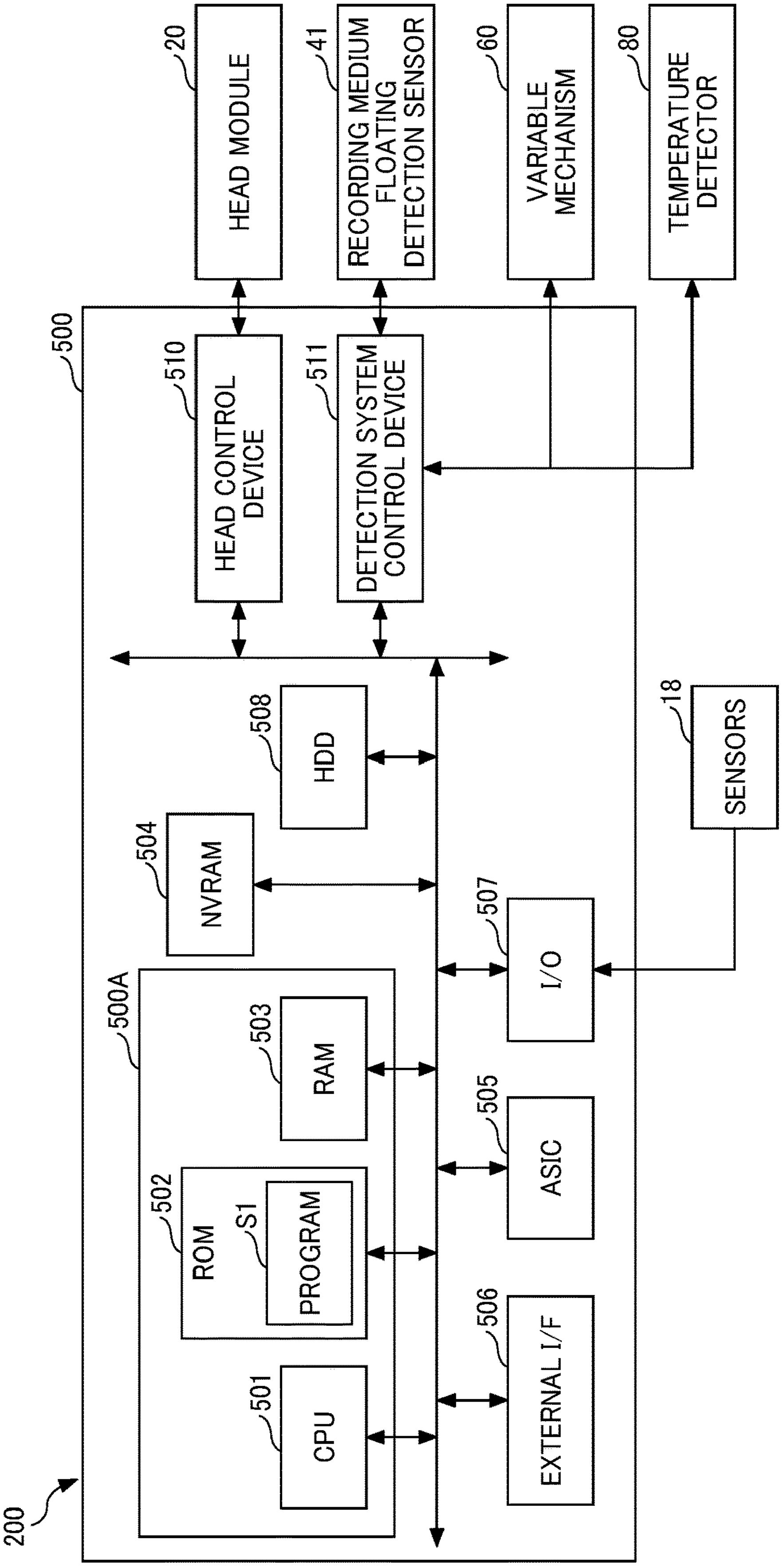
FIG. 11 is a block diagram illustrating a hardware configuration of the image forming apparatus, according to an embodiment of the present disclosure.

A hardware configuration of the image forming apparatus 200 is described next referring to FIG. 11. FIG. 11 is a block diagram illustrating a hardware configuration of the image forming apparatus 200 according to the embodiment. The hardware configuration illustrated in FIG. 11 may include additional components as needed. One or more of the components illustrated in FIG. 11 may be omitted from the hardware configuration as needed.

The image forming apparatus 200 includes a control device 500. The control device 500 includes a central processing unit (CPU) 501, a read-only memory (ROM) 502, a random-access memory (RAM) 503, a nonvolatile RAM (NVRAM) 504, and a hard disk drive (HDD) 508. The CPU 501 is in charge of control over the image forming apparatus 200. The ROM 502 stores various programs for causing the CPU 501 to control liquid discharge and various data for coating.

The RAM 503 temporarily stores various data. The NVRAM 504 is a nonvolatile memory, and can hold data while the power of the image forming apparatus 200 is turned off. The control device 500 includes a main controller 500A. The main controller 500A includes the CPU 501, the ROM 502, and the RAM 503.

The control device 500 includes an application specific integrated circuit (ASIC) 505. The ASIC 505 processes input and output signals for controlling the entire operation of the image forming apparatus 200. The ASIC 505 executes various kinds of signal processing on image data. The ASIC 505 also executes image processing on image data input to the control device 500.

The control device 500 includes an external interface (external I/F) 506 that can transmit and receive data and so forth to and from a personal computer (PC) that is an external device.

The control device 500 further includes an input/output (I/O) unit 507 for receiving detection signals output from sensors 18. The sensors 18 may include various temperature sensors.

The control device 500 includes a head control device 510 that controls drive of the head module 20. The head control device 510 can control a drive device of the head module 20. The head control device 510 can control a driving element of the head module 20 to execute liquid discharge.

The head control device 510 can execute various kinds of control relating to the head module 20.

The control device 500 includes a detection system control device 511. The detection system control device 511 controls the operations of the recording medium floating detection sensor 41 and the variable mechanism 60 in accordance with a command from the CPU 501.

Recording Medium Floating Detection System

Figure 12:
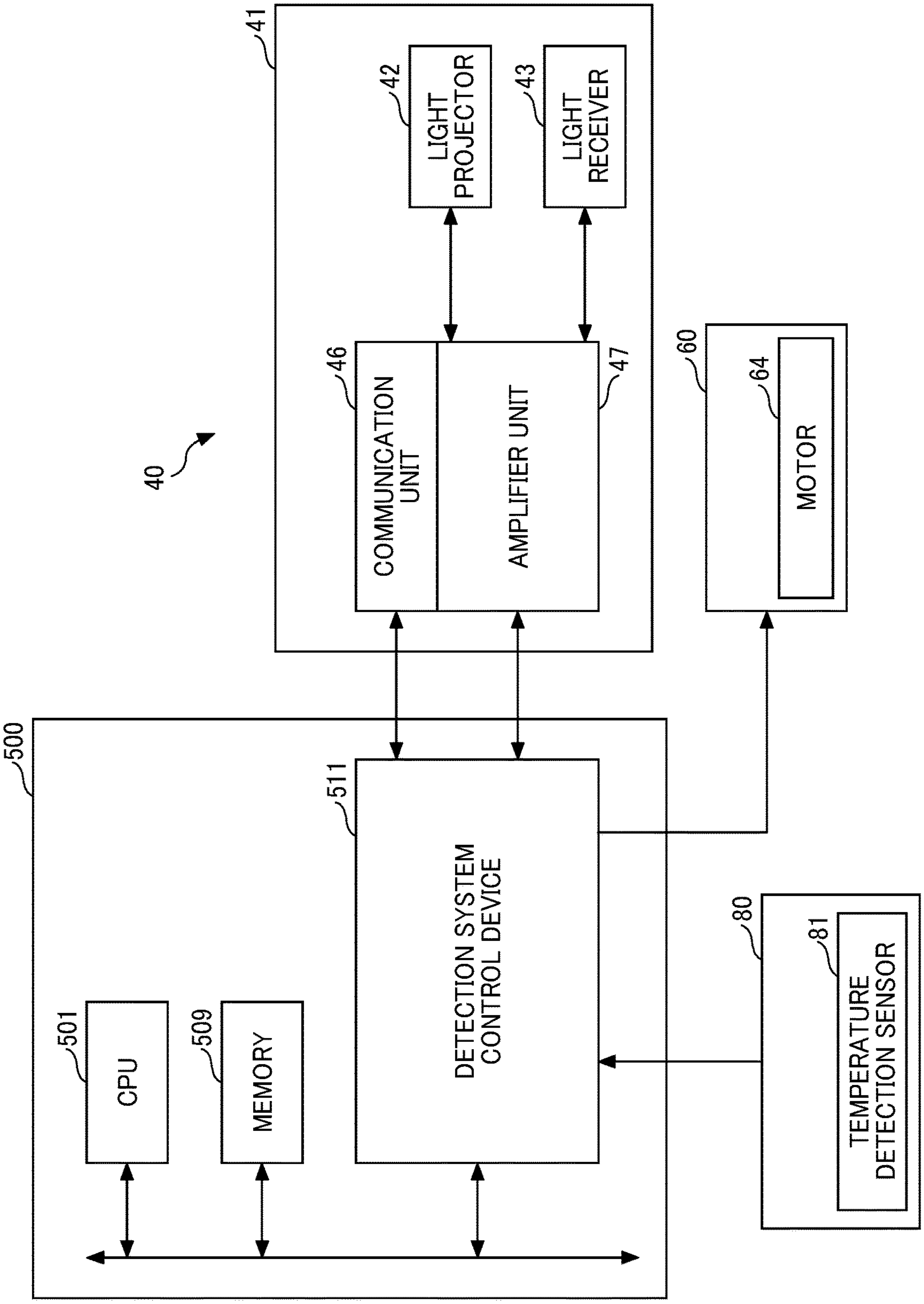
FIG. 12 is a block diagram illustrating a hardware configuration of a recording medium floating detection system, according to an embodiment of the present disclosure.

A hardware configuration of the recording medium floating detection system 40 is described next referring to FIG. 12. FIG. 12 is a block diagram illustrating an example of the hardware configuration of the recording medium floating detection system 40. The hardware configuration of the recording medium floating detection system 40 illustrated in FIG. 12 is a portion of the hardware configuration of the image forming apparatus 200 illustrated in FIG. 11. The hardware configuration illustrated in FIG. 12 may include additional components as needed. One or more of the components illustrated in FIG. 12 may be omitted from the hardware configuration as needed.

The recording medium floating detection system 40 includes the recording medium floating detection sensor 41 and the variable mechanism 60. A control device of the recording medium floating detection system 40 includes the detection system control device 511 and a temperature detector 80. The detection system control device 511 is electrically connected to the CPU 501 and a memory 509. The memory 509 may include the ROM 502, the RAM 503, the NVRAM 504, and the HDD 508. The detection system control device 511 is an example of a controller that controls the operation of the variable mechanism 60.

The recording medium floating detection sensor 41 includes the light projector 42, the light receiver 43, a communication unit 46, and an amplifier unit 47. The recording medium floating detection sensor 41 uses the communication unit 46 as an interface and receives information relating to a detection threshold from the detection system control device 511. The detection threshold is a threshold for judging floating of the recording medium PP.

The amplifier unit 47 recognizes a detection height h1 based on information output from the light receiver 43. The amplifier unit 47 judges floating of the recording medium PP based on the detection threshold and the detection height h1. The amplifier unit 47 judges that floating of the recording medium PP occurs when the detection height h1 is higher than the detection threshold. The recording medium floating detection sensor 41 outputs a judgement result about floating of the recording medium PP to the detection system control device 511.

The detection system control device 511 recognizes the temperature in the optical path of the laser beam 44 based on information output from the temperature detector 80. The detection system control device 511 determines the inclination amount of the light projector 42 based on the temperature in the optical path of the laser beam 44. The detection system control device 511 transmits data relating to the inclination amount to the motor 64 of the variable mechanism 60, drives the motor 64, and changes the inclination of the light projector 42. Thus, the emission direction of the laser beam 44 by the light projector 42 can be changed. The detection system control device 511 may recognize the temperature distribution in the optical path of the laser beam 44 based on the information output from the temperature detector 80. The detection system control device 511 may determine the inclination amount of the light projector 42 based on the temperature distribution in the optical path of the laser beam 44.

Temperature Detector

The temperature detector 80 includes a temperature detection sensor (temperature sensor) 81 that can detect a space temperature inside the image forming apparatus 200, and can detect the space temperature using the temperature detection sensor 81. The temperature detector 80 may detect the temperature distribution in the optical path of the laser beam 44 based on the detected space temperature. The temperature detection sensor 81 may be, for example, a thermocouple. The temperature detection sensor 81 is disposed close to the recording medium floating detection sensor 41.

Functional Configuration

Figure 13:
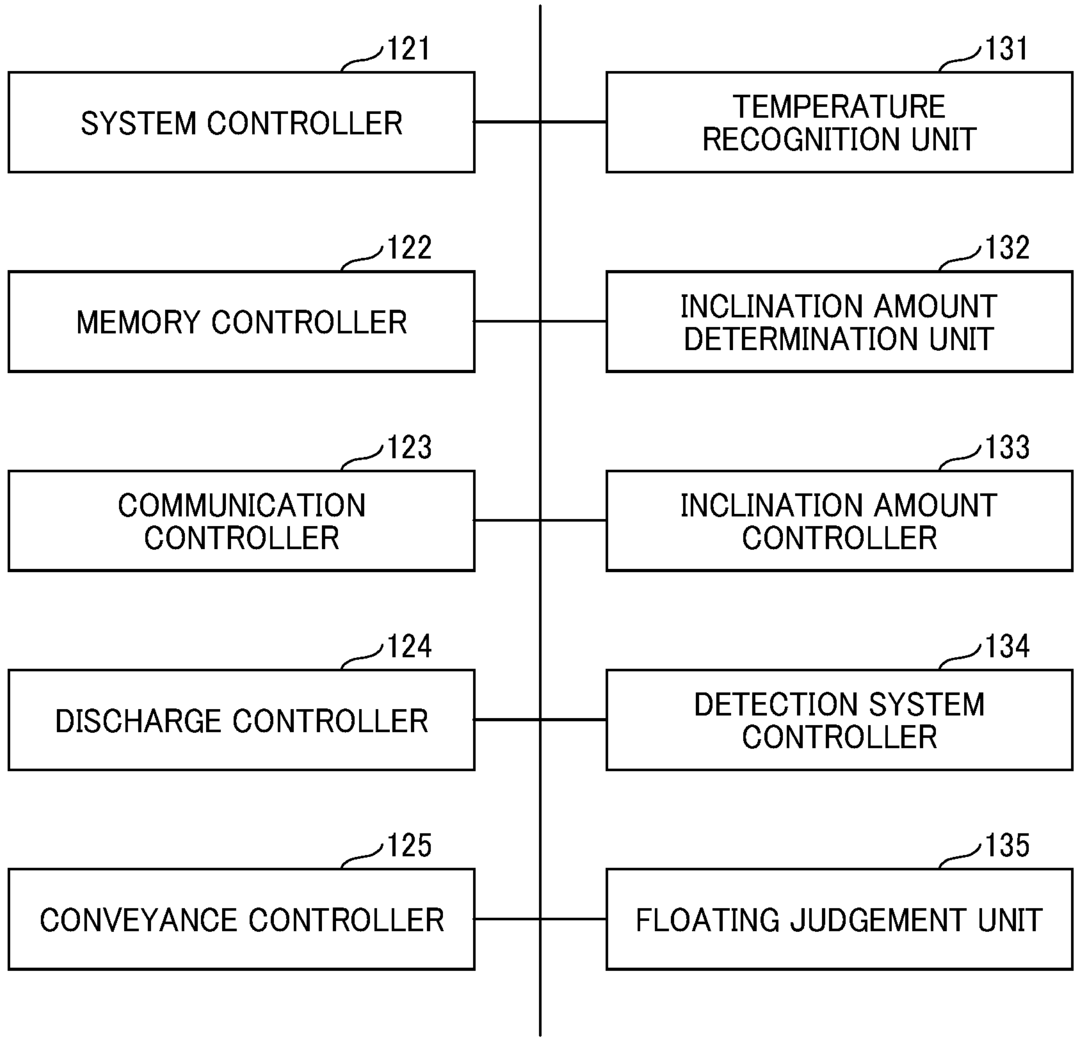
FIG. 13 is a functional block diagram of the image forming apparatus, according to an embodiment of the present disclosure.

A functional configuration of the image forming apparatus 200 is described next referring to FIG. 13. FIG. 13 is a functional block diagram of the image forming apparatus 200. The CPU 501 illustrated in FIG. 11 executes a program stored in a memory such as the ROM 502 to implement functions of a system controller 121, a memory controller 122, a communication controller 123, a discharge controller 124, a conveyance controller 125, a temperature recognition unit 131, an inclination amount determination unit 132, an inclination amount controller 133, a detection system controller 134, and a floating judgement unit 135 illustrated in FIG. 13. An external device and a sensor connected to the control device 500 may partially execute the functions.

The system controller 121 controls the entire operation of the image forming apparatus 200. The memory controller 122 controls the operations of the memories such as the ROM 502, the RAM 503, the NVRAM 504, and the HDD 508. The communication controller 123 controls communication with an external device connected to the control device 500.

The discharge controller 124 controls discharge of liquid by the head module 20. The conveyance controller 125 controls conveyance of the recording medium PP by the conveyance section. The conveyance section includes rollers that convey the recording medium PP and a motor that drives the rollers.

The temperature recognition unit 131 recognizes the temperature in the optical path of the laser beam 44 based on information output from the temperature detector 80. The temperature recognition unit 131 can judge whether there is a temperature difference in the optical path.

The inclination amount determination unit 132 can determine the inclination amount of the light projector 42 in accordance with the temperature in the optical path of the laser beam 44. The inclination amount determination unit 132 may determine the inclination amount θ in accordance with the temperature difference ΔT referring to the table presented in FIG. 9.

The inclination amount controller 133 controls the variable mechanism 60 to incline the light projector 42 by an inclination amount θ corresponding to the temperature in the optical path. Thus, the inclination amount controller 133 can change the emission direction of the laser beam 44. The inclination amount controller 133 may control the variable mechanism 60 to incline the light projector 42 by an inclination amount θ corresponding to the temperature difference ΔT in the optical path.

The detection system controller 134 controls the operation of the recording medium floating detection sensor 41. The detection system controller 134 controls the light projector 42 to emit the laser beam 44. The detection system controller 134 can acquire information relating to the detection height h1 output from the light receiver 43.

The floating judgement unit 135 judges whether floating of the recording medium PP occurs based on information relating to the detection height h1 acquired from the recording medium floating detection sensor 41. The floating judgement unit 135 can judge that floating of the recording medium PP occurs when the recording medium PP is separated and floating from the outer peripheral surface 10*a* of the drum 10.

The conveyance controller 125 can change the path of the recording medium PP so that the recording medium PP is not supplied to the head module 20 when floating of the recording medium PP occurs. The conveyance controller 125 can drive a guide for changing the conveyance path of the recording medium PP to change the conveyance path of the recording medium PP.

The system controller 121, the memory controller 122, the communication controller 123, the discharge controller 124, the conveyance controller 125, the temperature recognition unit 131, the inclination amount determination unit 132, the inclination amount controller 133, the detection system controller 134, and the floating judgement unit 135 can be implemented by software using a program stored in the memory. All or part of the system controller 121, the memory controller 122, the communication controller 123, the discharge controller 124, the conveyance controller 125, the temperature recognition unit 131, the inclination amount determination unit 132, the inclination amount controller 133, the detection system controller 134, and the floating judgement unit 135 may be implemented by hardware such as an integrated circuit (IC).

The program may be recorded in a computer-readable storage medium such as a compact disc read-only memory (CD-ROM) or a flexible disk (FD) as file information in an installable or an executable format, and may be loaded into the image forming apparatus 200 via such a storage medium.

Alternatively, the program may be recorded in a computer-readable storage medium such as a compact disc-recordable (CD-R), a digital versatile disc (DVD), a Blu-ray® disc, or a semiconductor memory, and may be loaded into the image forming apparatus 200 via such a storage medium. The program to be installed may be downloaded into the image forming apparatus 200 via a network such as the Internet. The program may be incorporated in advance in a ROM or the like of the image forming apparatus 200.

The control device 500 may execute functions that are executed by a computer connected to the control device 500. Likewise, the computer connected to the control device 500 may execute functions that are executed by the control device 500.

Change in Inclination Amount

Figure 14:
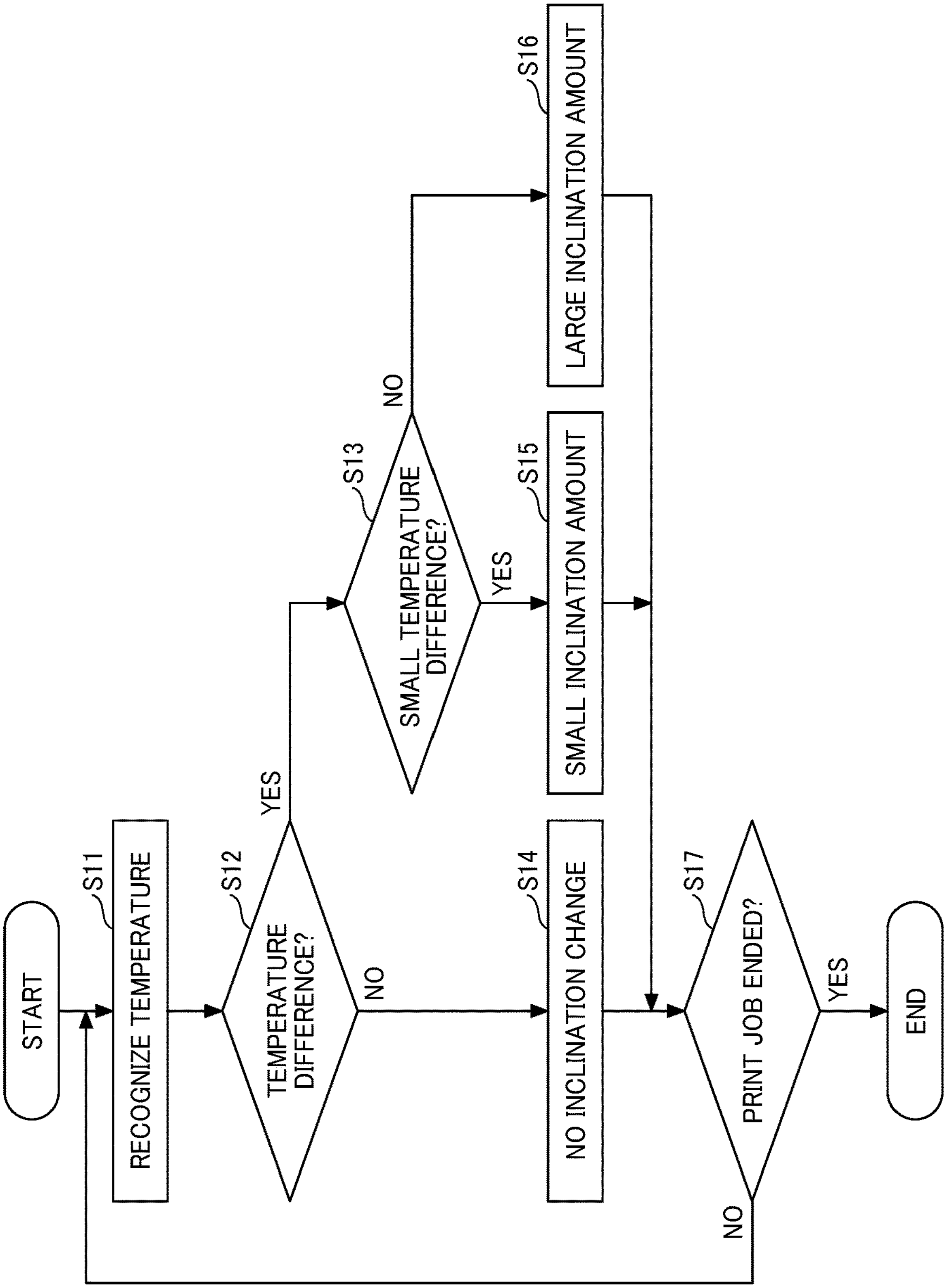
FIG. 14 is a flowchart presenting a processing procedure in the recording medium floating detection system, according to an embodiment of the present disclosure.

Next, a change in the inclination amount θ of the laser beam 44 executed by the recording medium floating detection system 40 will be described. FIG. 14 is a flowchart presenting an example of a processing procedure in the recording medium floating detection system 40.

The temperature recognition unit 131 of the control device 500 recognizes the temperature in the optical path of the laser beam 44 (step S11). The temperature recognition unit 131 acquires information relating to the temperature in the optical path from the temperature detector 80. As illustrated in FIG. 6, the temperature recognition unit 131 acquires information relating to the temperatures T1 and T2 in the optical path.

Then, the temperature recognition unit 131 judges whether there is a temperature difference ΔT between the temperature T1 and the temperature T2 (step S12). The temperature recognition unit 131 judges that there is the temperature difference ΔT when the temperature difference ΔT is a judgement threshold (first judgement threshold) or more. When there is the temperature difference ΔT (step S12; YES), the processing proceeds to step S13, and when there is no temperature difference ΔT (step S12; NO), the processing proceeds to step S14. The temperature recognition unit 131 may recognize that a temperature distribution is generated in the optical path when there is the temperature difference ΔT. Alternatively, the temperature recognition unit 131 may judge whether the temperature in the optical path is a predetermined judgement threshold or more. The temperature recognition unit 131 may judge that the temperature difference ΔT is the judgement threshold or more when the temperature in the optical path is the predetermined judgement threshold or more.

In step S13, the temperature recognition unit 131 judges whether the temperature difference ΔT is small. When the temperature difference ΔT is less than a judgement threshold (second judgement threshold), the temperature recognition unit 131 can judge that the temperature difference ΔT is small. When the temperature difference ΔT is small (step S13; YES), the processing proceeds to step S15, and when the temperature difference ΔT is large (step S13; NO), the processing proceeds to step S16. Alternatively, the temperature recognition unit 131 may judge whether the temperature in the optical path is less than a predetermined judgement threshold. The temperature recognition unit 131 may judge that the temperature difference ΔT is less than the judgement threshold when the temperature in the optical path is less than the predetermined judgement threshold.

In step S14, the inclination amount controller 133 of the control device 500 does not change the inclination amount θ of the laser beam 44. Alternatively, when the inclination amount θ of the laser beam 44 has been changed, the inclination amount controller 133 controls the variable mechanism 60 to return the inclination amount θ to zero so that the laser beam 44 is emitted in the Y-axis direction.

In step S15, the inclination amount controller 133 controls the variable mechanism to change the inclination amount θ to a smaller value. In step S16, the inclination amount controller 133 controls the variable mechanism 60 to change the inclination amount θ to a larger value. The magnitude of the inclination amount θ can be determined referring to the table presented in FIG. 9. The larger the temperature difference ΔT, the larger the inclination amount θ. The smaller the temperature difference ΔT, the smaller the inclination amount θ.

After steps S14 to S16 are ended, the control device 500 proceeds to step S17 and judges whether a print job has been ended. When the print job has been ended (step S17; YES), the processing is ended. When the print job has not been ended (step S17; NO), the operation returns to step S11 and the processing from step S11 to step S17 is repeated.

In steps S14 to S16, the case where the inclination is classified into the three levels, such as "no inclination change", "small inclination amount", and "large inclination amount", is presented; however, the inclination may be classified into two levels or four or more levels. The control device 500 may periodically execute the processing from step S11 to step S17, or may execute the processing and adjust the inclination amount θ, for example, per minute.

Advantageous Effect of Image Forming Apparatus

With the image forming apparatus 200 as described above, the laser beam 44 is emitted from the light projector 42, and the laser beam 44 that has passed through the area above the conveyance path is received by the light receiver 43, thereby detecting floating of the recording medium PP. In the image forming apparatus 200, the temperature in the optical path of the laser beam 44 can be detected using the temperature detector 80. In the image forming apparatus 200, the emission direction of the laser beam 44 emitted from the light projector 42 can be inclined using the variable mechanism 60. In the image forming apparatus 200, the variable mechanism 60 can be controlled based on the temperature in the optical path detected by the temperature detector 80. The control device 500 of the image forming apparatus 200 can drive the variable mechanism 60 to change the inclination of the light projector 42 when the temperature in the optical path is the predetermined judgement threshold or more. Thus, the image forming apparatus 200 can change the inclination amount θ of the emission direction of the laser beam 44 emitted from the light projector 42.

With such an image forming apparatus 200, even when the temperature in the optical path is the predetermined judgement threshold or more and the laser beam 44 bends, the emission direction of the laser beam 44 can be adjusted by inclining the light projector 42 using the variable mechanism 60. Thus, an error in measurement of the detection height h1 can be reduced. "The predetermined judgement threshold" in this case is a judgement threshold with which it is detectable that a temperature difference is generated in the optical path and the laser beam 44 bends due to the temperature difference.

Since the image forming apparatus 200 includes the temperature detection sensor 81 that detects the space temperature inside the image forming apparatus 200, the temperature of the space in the optical path of the laser beam 44 can be detected. Accordingly, the detection system control device 511 can recognize whether a temperature difference is generated in the optical path. As illustrated in FIG. 6, the detection system control device 511 can recognize whether a temperature distribution is generated based on the temperature difference between the temperature T1 and the temperature T2.

When the image forming apparatus 200 detects floating of the recording medium PP, the recording medium PP may be inhibited from being supplied to the head module 20. Thus, the recording medium PP floating to a predetermined height or more is prevented from coming into contact with the head module 20. Consequently, damage (head attack) of the head module 20 can be prevented.

For example, the image forming apparatus 200 may be an inkjet commercial printer. In such a commercial printer, the distance between the head module 20 and the recording medium PP may be about 1 mm to provide high image quality. In the case of such a commercial printer, even when slight floating of the recording medium PP occurs, the recording medium PP and the head module 20 may come into contact with each other and the head module 20 may be damaged.

Since the image forming apparatus 200 can accurately detect floating of the recording medium PP and suppress the occurrence of a head attack, the head module 20 can be disposed close to the conveyance path of the recording medium PP. Thus, the image forming apparatus 200 can provide high image quality.

First Modification

Figure 15:
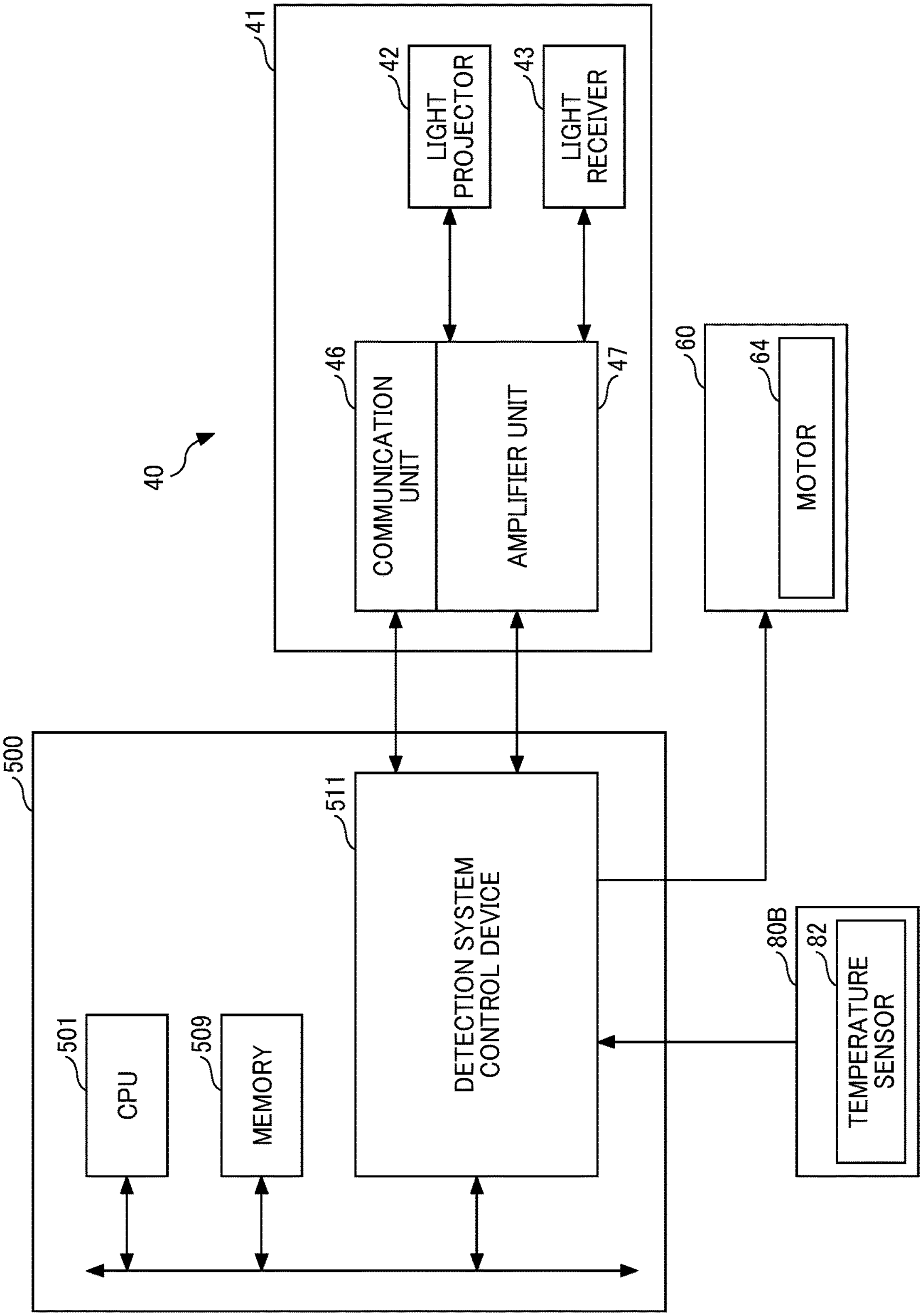
FIG. 15 is a block diagram illustrating a hardware configuration of a recording medium floating detection system according to a first modification.

Now, an image forming apparatus 200 according to a first modification is described. The image forming apparatus 200 may include a temperature detector 80B according to the first modification instead of the temperature detector 80 described above. FIG. 15 is a block diagram illustrating a hardware configuration of a recording medium floating detection system 40 according to the first modification. In the description of the image forming apparatus 200 according to the first modification, the same description as that of the image forming apparatus 200 according to the above-described embodiment is omitted.

As illustrated in FIG. 15, the temperature detector 80B according to the first modification includes a temperature sensor 82 that can detect the temperature of a recording medium PP after printing, and can detect the temperature of the recording medium PP using the temperature sensor 82. Examples of a thermometer that can detect the temperature of the recording medium PP include a radiation thermometer. The temperature detector 80 can detect the temperature in the optical path of the laser beam 44 based on the temperature of the recording medium PP after printing.

The temperature recognition unit 131 of the image forming apparatus 200 according to the first modification can detect the temperature in the optical path of the laser beam 44 based on the temperature of the recording medium PP after printing, which is output from the temperature sensor 82. The temperature recognition unit 131 can judge whether there is a temperature difference in the optical path. For example, the memory 509 stores in advance data indicating the relationship between the temperature of the recording medium PP after printing and the temperature difference ΔT in the optical path. The data indicating the relationship with the temperature difference ΔT in the optical path may be data relating to a generation state of a temperature distribution.

Figure 16:
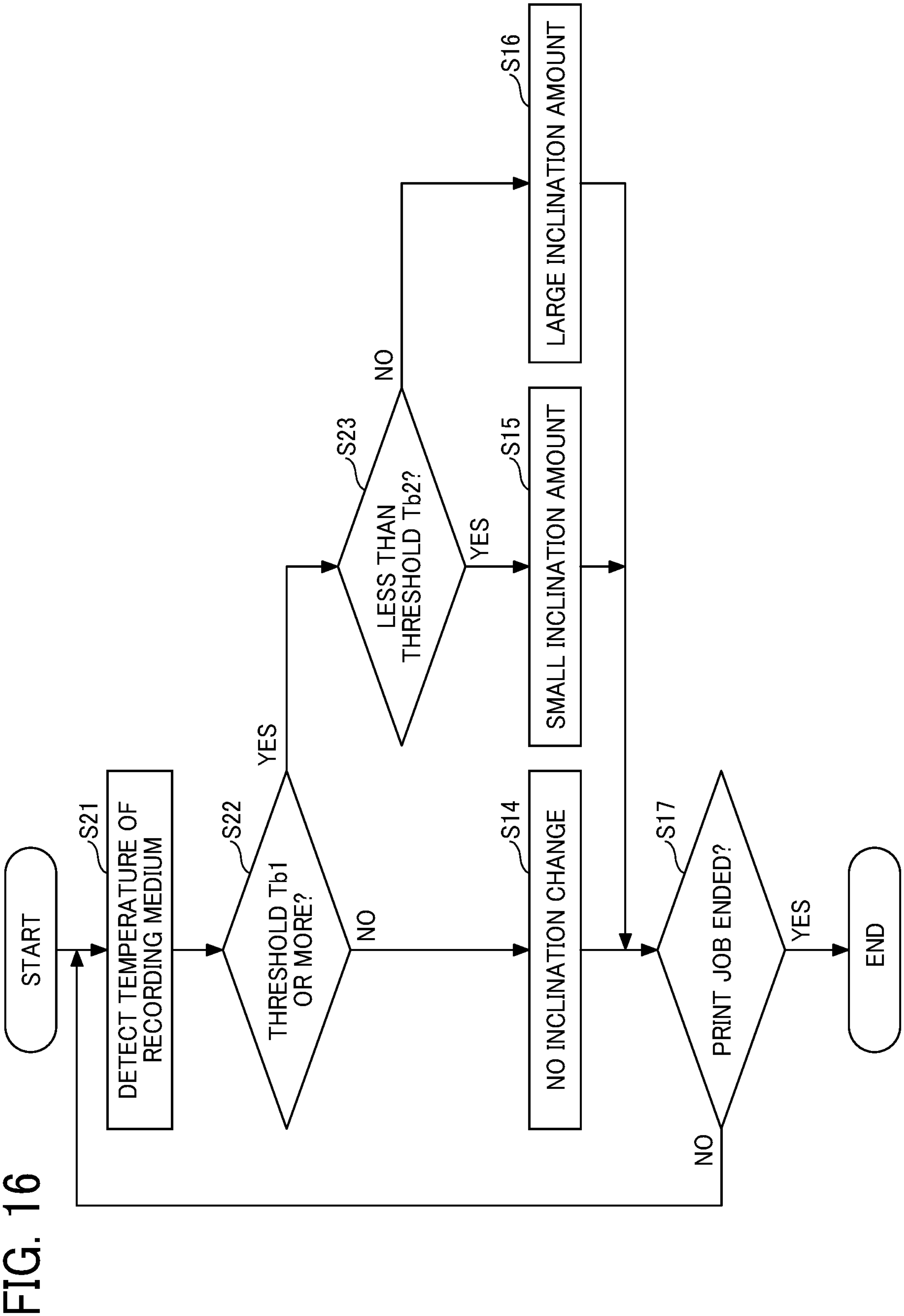
FIG. 16 is a flowchart presenting a processing procedure in the recording medium floating detection system according to the first modification.

FIG. 16 is a flowchart presenting a processing procedure in the recording medium floating detection system 40 according to the first modification. The image forming apparatus 200 detects the temperature of the recording medium PP after printing (step S21). The temperature recognition unit 131 detects the temperature in the optical path of the laser beam 44 based on the temperature of the recording medium PP after printing.

Then, the temperature recognition unit 131 judges whether the temperature of the recording medium PP after printing is a judgement threshold Tb1 (first judgement threshold) or more (step S22). The temperature recognition unit 131 proceeds to step S23 when the temperature of the recording medium PP is the judgement threshold Tb1 or more (step S22; YES), and proceeds to step S14 when the temperature of the recording medium PP is less than the judgement threshold Tb1 (step S22; NO). When the temperature of the recording medium PP after printing is the judgement threshold Tb1 or more, the temperature recognition unit 131 can recognize that the temperature difference ΔT is generated in the optical path.

In step S23, the temperature recognition unit 131 judges whether the temperature difference ΔT is small. When the temperature difference ΔT is less than a judgement threshold Tb2 (second judgement threshold), the temperature recognition unit 131 can judge that the temperature difference ΔT is small. When the temperature difference ΔT is small (step S23; YES), the processing proceeds to step S15, and when the temperature difference ΔT is large (step S23; NO), the processing proceeds to step S16. Accordingly, the image forming apparatus 200 can recognize a generation state of the temperature difference ΔT in the optical path and change the inclination amount θ in accordance with the temperature of the recording medium PP.

The image forming apparatus 200 according to the first modification also attains an advantageous effect similar to that of the image forming apparatus 200 according to the above-described embodiment. The image forming apparatus 200 according to the first modification includes the temperature sensor 82 that detects the temperature of the recording medium PP that has been conveyed by the conveyance section and has undergone printing, and can detect the temperature in the optical path based on the detected temperature of the recording medium PP.

Second Modification

An image forming apparatus 200 according to a second modification is described next. The image forming apparatus 200 may include a temperature detector 80 according to the second modification instead of the temperature detector 80 described above.

In the description of the image forming apparatus 200 according to the second modification, the same description as that of the image forming apparatus 200 according to the above-described embodiment is omitted. The image forming apparatus 200 according to the second modification may include a number-of-prints detector that detects the number of prints. The number-of-prints detector is implemented by the CPU 501 executing the program stored in the memory such as the ROM 502. Alternatively, the number-of-prints detector is implemented by hardware such as an IC.

The temperature detector 80 of the image forming apparatus 200 according to the second modification may output information relating to the temperature in the optical path based on print job information such as the number of prints. The temperature detector 80 may output information relating to the temperature in the optical path based on, for example, the number of prints per unit time. The temperature detector 80 may output information relating to the temperature difference ΔT in the optical path based on the number of prints per unit time.

The memory 509 of the image forming apparatus 200 stores data indicative of the relationship between the number of prints per unit time and the temperature inside the housing of the image forming apparatus 200. The temperature recognition unit 131 can judge whether the temperature difference ΔT in the optical path is generated based on the number of prints per unit time, and output the judgement result.

The image forming apparatus 200 according to the second modification also attains an advantageous effect similar to that of the image forming apparatus 200 according to the above-described embodiment. The image forming apparatus 200 according to the second modification includes the number-of-prints detector that detects the number of prints of recording media PP, and can detect the temperature in the optical path based on the number of prints of the recording media PP. The image forming apparatus 200 can control the operation of the variable mechanism 60 based on the temperature in the optical path to change the emission direction of the light from the light projector 42.

The present disclosure is not limited to the above-described embodiment, and numerous additional modifications and variations are possible without departing from or changing the technical idea of the present disclosure.

In the above-described embodiment, the case has been described where the light projector 42 and the light receiver 43 are disposed to face each other in the Y-axis direction with the conveyance path of the recording medium PP interposed therebetween; however, the light projector 42 and the light receiver 43 are not limited thereto. For example, the light projector 42 and the light receiver 43 may be disposed as one module at the same position in the Y-axis direction. The recording medium floating detection sensor having the configuration may include a mirror disposed to face the module including the light projector 42 and the light receiver 43 with the conveyance path interposed therebetween. Light emitted from the light projector 42 passes through an area above the conveyance path, and then is reflected by the mirror. The light receiver 43 receives the laser beam that has been reflected by the mirror and has passed through the area above the conveyance path again. Implementation of the light projector and the light receiver to emit and receive light at a very small angle due to characteristics such as diffraction of light may suppress variations in detection of the recording medium PP.

In the above-described embodiment, the case has been described where the variable mechanism 60 including the worm gear 62 and the motor 64 is provided; however, the inclination mechanism is not limited thereto. The inclination mechanism may include another guide mechanism and an actuator. The inclination mechanism may include, for example, a hinge mechanism, a ball screw, or an air cylinder. Alternatively, a mirror or the like may be used to change the emission direction of light.

While the temperature detector 80 detects the temperature in the optical path in the above-described embodiment, the temperature detector 80 may detect a temperature distribution in the optical path in the Z-axis direction. The temperature detector 80 may detect, for example, a temperature distribution in the optical path in the Y-axis direction, or a temperature distribution in a direction inclined with respect to the Z-axis direction and the Y-axis direction. The temperature detector 80 may detect a position at which a temperature difference is generated in the Y-axis direction, and change the inclination amount θ of the laser beam 44 in accordance with the detected position.

Part of the functions of the above-described embodiment to be executed by the controller can be implemented by one or a plurality of processing circuits or circuitry. Examples of the "processing circuits or circuitry" in the specification include a programmed processor, as a processor that is mounted on an electronic circuit and that executes the functions through software. Examples of the "processing circuits or circuitry" also include devices such as an application specific integrated circuit (ASIC), a digital signal processor (DSP), a field programmable gate array (FPGA), and conventional circuit components designed to execute the recited functions.

When a temperature difference is generated in an optical path, light may be bent. Thus, the recording apparatus may fail to accurately detect the floating of the recording medium.

According to one or more embodiments of the present disclosure, the emission direction of the light emitted from the light projector is inclined based on the temperature in the optical path, thereby suppressing the influence due to bending of the light. Thus, the image forming apparatus that can accurately detect the floating of the recording medium can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a conveyance section configured to convey a recording medium along a conveyance path;

a floating detector including a light projector and a light receiver and configured to detect floating of the recording medium based on a light reception result by the light receiver of light emitted from the light projector and passing above the conveyance path;

a temperature detector configured to detect a temperature in an optical path of the light;

a variable mechanism configured to change an emission direction of the light from the light projector; and circuitry configured to control an operation of the variable mechanism based on the temperature detected by the temperature detector.

2. The image forming apparatus according to claim 1, wherein the temperature detector includes a temperature sensor that detects a space temperature inside the image forming apparatus, wherein the temperature detector detects the temperature in the optical path based on the space temperature inside the image forming apparatus.

3. The image forming apparatus according to claim 1, wherein the temperature detector includes a temperature sensor that detects a temperature of the recording medium conveyed by the conveyance section, wherein the temperature in the optical path is detected based on the temperature of the recording medium.

4. The image forming apparatus according to claim 1, wherein the circuitry is configured to detect a number of prints of recording media, and the temperature detector detects the temperature in the optical path based on the number of prints of the recording media.

5. The image forming apparatus according to claim 1, wherein the conveyance section includes a drum configured to rotate while holding the recording medium on an outer peripheral surface of the drum, and wherein the floating detector detects floating of the recording medium from the outer peripheral surface.

6. A control device for a medium floating detection system that detects floating of a recording medium based on a light reception result by a light receiver of light emitted from a light projector and passing above a conveyance path of the recording medium, the control device comprising:

a temperature detector configured to detect a temperature in an optical path of the light; and circuitry configured to control an operation of a variable mechanism that changes an emission direction of the light from the light projector based on the temperature detected by the temperature detector.

7. An apparatus comprising:

a light projector configured to emit a light;

a temperature detector configured to detect a temperature in an optical path of the light;

a variable mechanism configured to change an emission direction of the light from the light projector; circuitry configured to control an operation of the variable mechanism based on the temperature detected by the temperature detector;

a light receiver to receive the light emitted from the light projector;

a conveyance section configured to convey an object along a conveyance path; and a detector configured to detect the object based on a light reception result by the light receiver of the light emitted from the light projector.

8. The apparatus according to claim 7, wherein the detector is configured to detect the object on the conveyance path.

9. The apparatus according to claim 8, wherein the detector is configured to detect floating of the object.

* * * * *